UNITED STATES PATENT OFFICE.

OTTO THIEME AND FREDERICK OTTO MUELLER, OF ST. LOUIS, MISSOURI, ASSIGNORS TO MOON-HOPKINS BILLING MACHINE COMPANY, OF ST. LOUIS, MISSOURI, A CORPORATION OF MISSOURI.

TABULATING MECHANISM FOR COMBINED ADDING AND TYPE-WRITING MACHINES.

1,259,930.  Specification of Letters Patent.  Patented Mar. 19, 1918.

Application filed August 16, 1917. Serial No. 186,474.

*To all whom it may concern:*

Be it known that we, OTTO THIEME and FREDERICK OTTO MUELLER, citizens of the United States, residing at city of St. Louis, State of Missouri, have invented a certain new and useful Improvement in Tabulating Mechanism for Combined Adding and Type-Writing Machines, of which the following is a full, clear, and exact description, such as will enable others skilled in the art to which it appertains to make and use the same, reference being had to the accompanying drawings, forming part of this specification, in which—

Fig. 1<sup>A</sup> is a diagrammatic view illustrating the arc of movement of the pitman which rocks the main shaft of the adding mechanism.

Fig. 3 is a vertical sectional view showing our improved tabulating mechanism in normal position.

Fig. 3<sup>A</sup> is a detailed view of the parts operated by the multiplier keys to disable the tabulating mechanism.

This invention relates to a new and useful improvement in tabulating mechanisms for combined adding and typewriting machines of the same general character as that disclosed in application for United States Letters Patent filed by Otto Thieme, May 18, 1917, Serial No. 169,586.

In the present application, we have disclosed a form of adding mechanism such as is illustrated and described in United States application Serial No. 112,534 filed by said Otto Thieme, August 1, 1916, although it is obvious that the tabulating mechanism is capable of use in connection with the adding mechanism of the Moon-Hopkins billing machine such as illustrated in Hubert Hopkins's application Serial No. 310,739 filed April 9, 1906.

The objects of our present invention are to simplify and make more positive the operation of the various parts entering into the tabulating mechanism and at the same time to construct such parts of heavier material so that they are not liable to become broken or fractured in service.

In combined adding and typewriting machines to which our improved tabulating mechanism is especially designed to be applied, there is a typewriting machine having the usual letter and figure printing elements for making an impression upon the paper carried by a laterally movable paper carriage. This typewriting mechanism is a complete operative entity in and of itself and the adding mechanism of the machine likewise is a complete operative entity, except that the printing type of the adding mechanism is designed to make a printing impression upon the same sheet of paper receiving impressions from the type of the typewriting mechanism. The impressions made by the adding machine type are in the same line as the impressions made by the type of the typewriter, in consequence of which, bills, invoices, statements, etc., can be conveniently and expeditiously produced, the items composed of different words being written by the typewriting mechanism while the amounts are printed by the type of the adding mechanism and accumulated in the totalizer or totalizers thereof so that the footings can be obtained at the end of the column. In statistical work containing one or more columns of figures to be totalized, there are several tabulating blocks whereby the paper carriage may be spaced leftwardly to position the paper for receiving impressions from the adding machine type; whereas, in making out bills or invoices it is sometimes desirable to use only one tabulating block so that after the item is written in the carriage will be spaced leftwardly so as to position the paper to receive impressions from the type of the adding mechanism in the nature of extensions, these extensions being accumulated by the adding mechanism so that proper total or footing can be printed at the bottom of the column.

In such a machine as that above briefly described, there are several controls for the tabulating bar. One control is in the nature of a tabulating key whose sole function is to position the tabulating bar and incidentally release the paper carriage so that it will be spaced leftwardly. Another control involves, in connection with the operation of the tabulating key, the connection of the motor to the main operating shaft of the adding machine. Still another control resides in the operation of another motor key for connecting the motor drive to the main operating shaft of the adding machine, but upon the operation of which last-mentioned motor key, the parts connected to the tabulating mechanism are disabled so that when this motor key is depressed, the tabulating mechanism will not be operated. When the tabulating mechanism is operated in connection with the depression of a motor key, to effect tabulation, such tabulation, that is the leftward movement of the carriage, is deferred until the main operating shaft of the adding mechanism is about completing its final movement, i. e., said main operating shaft is caused to first rock in one direction through a quadrant of about forty degrees and then rocked in the opposite direction back to its starting point.

Figures 4, 5:
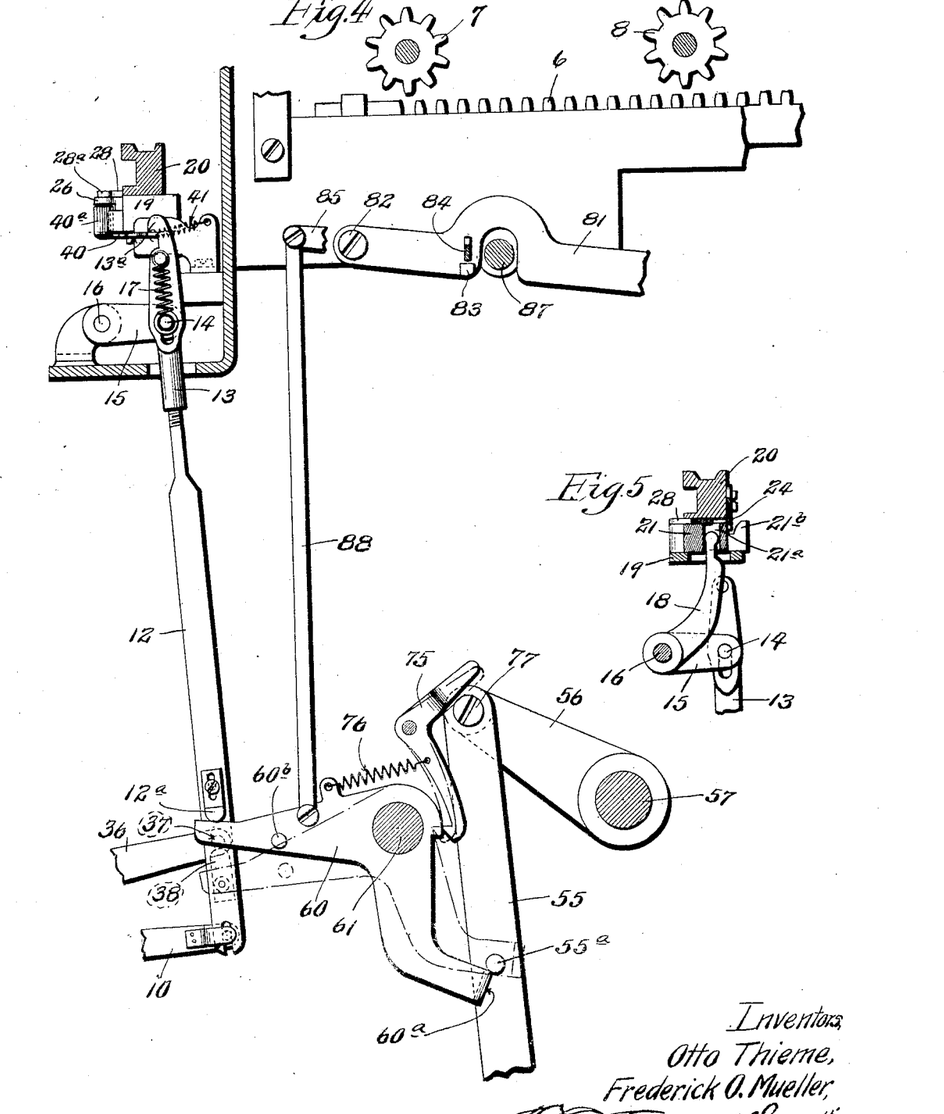
Fig. 4 is a similar view showing the same in a changed position.
Fig. 5 is a detail vertical sectional view on line 5—5 of Fig. 2.
Figure 6:
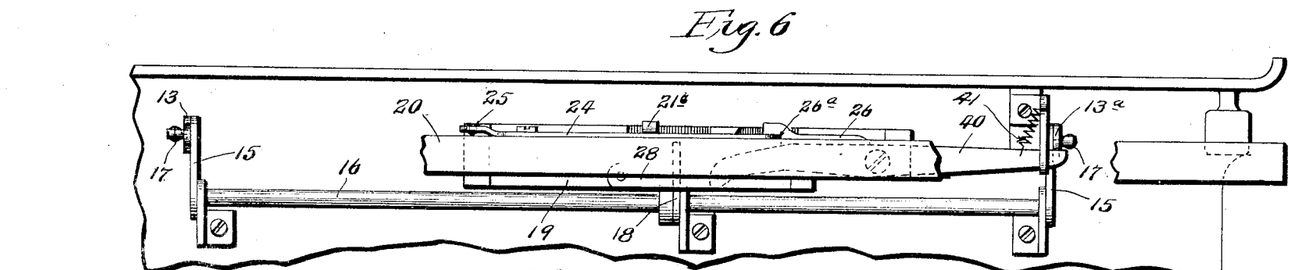
Fig. 6 is a top plan view of the tabulating mechanism.
Figures 7, 8, 9, 10:
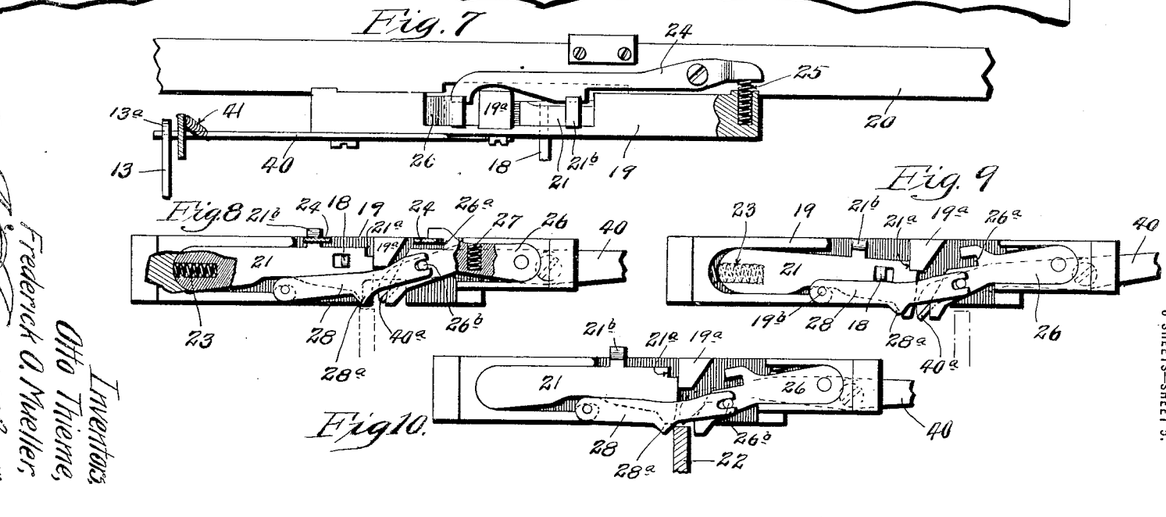
Fig. 7 is a rear elevational view of the same.
Fig. 8 is a top plan view of certain of the parts in horizontal section.
Fig. 9 is a similar view showing the parts in changed position.
Fig. 10 is a similar view showing the parts in changed position.
Figure 11:
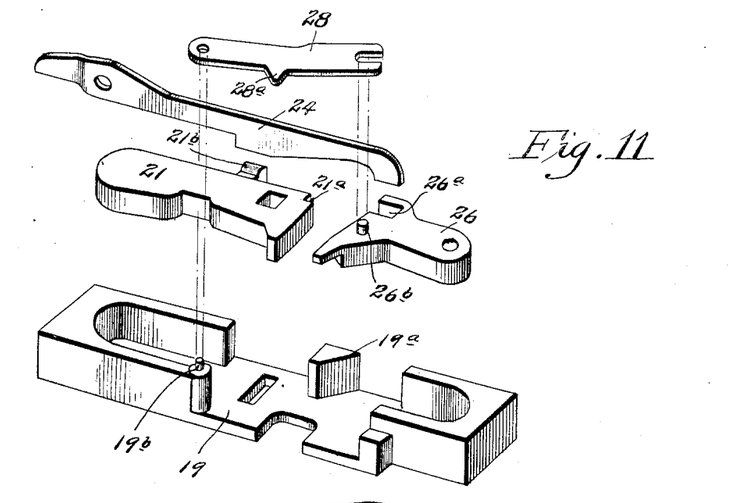
Fig. 11 is a detail view of parts of the tabulating mechanism detached.
Figure 12:
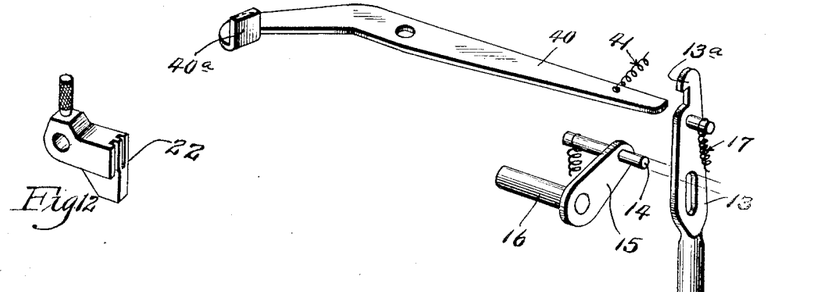
Fig. 12 is a detail view of one of the adjustable tabulating stops.
Figure 13:
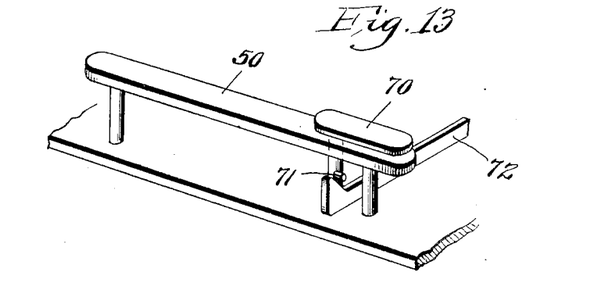
Fig. 13 is a detail view of the motor bar tabulator and the motor bar non-tabulating key.

In the drawings, 1 indicates the base of the machine; 2 the keys of the typewriting mechanism; 3 the typewriter carriage containing the usual platen 4, and being capable of step by step letter spacing movement as is usual. 5 are the keys of the adding mechanism. 6 are the racks whose excursions of movement are controlled by the adding machine keys, said racks coöperating with the totalizer wheels 7 and 8. 9 are the printing type of the adding machine. 10 is the tabulating key bar pivoted at 11 and having a coupling connection at its rear end with the tabulating bar 12. This tabulating bar is provided with a screw eye 13 at its upper end whereby it may be adjustably connected to pin 14 carried by rock arms 15 connected together by a rock shaft 16. There are two of these tabulating bars, one at each side of the machine, their lower ends being connected together by a universal bar so that they may be moved in unison. This, however, we do not consider as important as one of such bars would suffice, and the reason for using two is to relieve the rock shaft 16 of undue torsional strain. The connection between the screw eyes 13 and the pin 14 is through the medium of the slots through which the pins 14 pass, a spring 17 being employed to connect the pin 14 with the upper end of the screw eye 13, whereby the pin 14 is normally held in the upper end of the slot, and consequently, through the yielding connections thus afforded, the bar or bars 12 may be raised in the event that the rock shaft 16 meets with an obstruction. This may be designated as a broken or yielding connection in the tabulating bar which is highly desirable in certain operations of the machine as, for instance, where the parts are untimely operated and the shaft 16 meets with resistance. Shaft 16 carries a finger 18, which finger extends up through a slot in the bottom of a housing frame plate 19 (see Fig. 5), which housing frame plate is secured to the stationary rail 20 upon which the paper carriage moves (see Fig. 1). This housing 19 is best shown in Fig. 11 wherein it will be seen to consist of a block recessed in its top to provide a mount for the movable parts of the tabulating mechanism. One of these movable parts is an anvil block 21 which receives the blow of the tabulating stop 22 on the carriage when the same is moving in the operation of tabulation. This anvil block 21 is provided with an opening for receiving the upper rounded end of the finger 18 (see Fig. 5). This opening is slightly elongated, as shown in Fig. 8, so as to permit the anvil block to be moved rightwardly under the impelling action of its spring 23 or to the position shown in Fig. 9. The anvil block 21 is formed slightly tapering so that it may rock in its bearing when the finger 18 is operated to move the inner or free end of said block forwardly to its tabulating position. When in this forward position a shoulder $21^a$ engages a lug $19^a$ on the housing 19, as shown in Fig. 9, so as to locate the anvil block in its forward or tabulating position,—the spring 23 moving said anvil block rightwardly. The anvil block 21 is provided with a cam face $21^b$ at its rear edge which coöperates with a lever 24 pivotally mounted on the rear of the track rail 20. This lever 24 coöperates with a spring 25 at one end whereby the opposite end of said lever is normally held in engagement with the inclined face $21^b$ of the anvil block. 26 indicates a rebound block pivotally mounted in a housing 19, said rebound block having a spring 27 which normally tends to force the same forwardly. This rebound block 26 is provided with a recess $26^a$ which coöperates with the end of lever 24 just above described; consequently, whenever finger 18 moves the anvil block 21 forwardly, its spring 23 will force said anvil block into a locked forward position and at the same time the inclined face 21ᵇ thereof will operate the lever 24 so as to release the rebound block 26 permitting it to be moved forwardly by its spring 27 to the position shown in Fig. 9. When the anvil block occupies its forward position, the lever 24 is held elevated and consequently the rebound block may be vibrated freely. The rebound block is provided with a pin 26ᵇ which enters a slot in the end of a restoring lever 28, said restoring lever being pivoted on a pin 19ᵇ on housing 19. This restoring lever is provided with a tooth or projection 28ª extending forwardly substantially in line with the free end of the anvil block.

Figure 2:
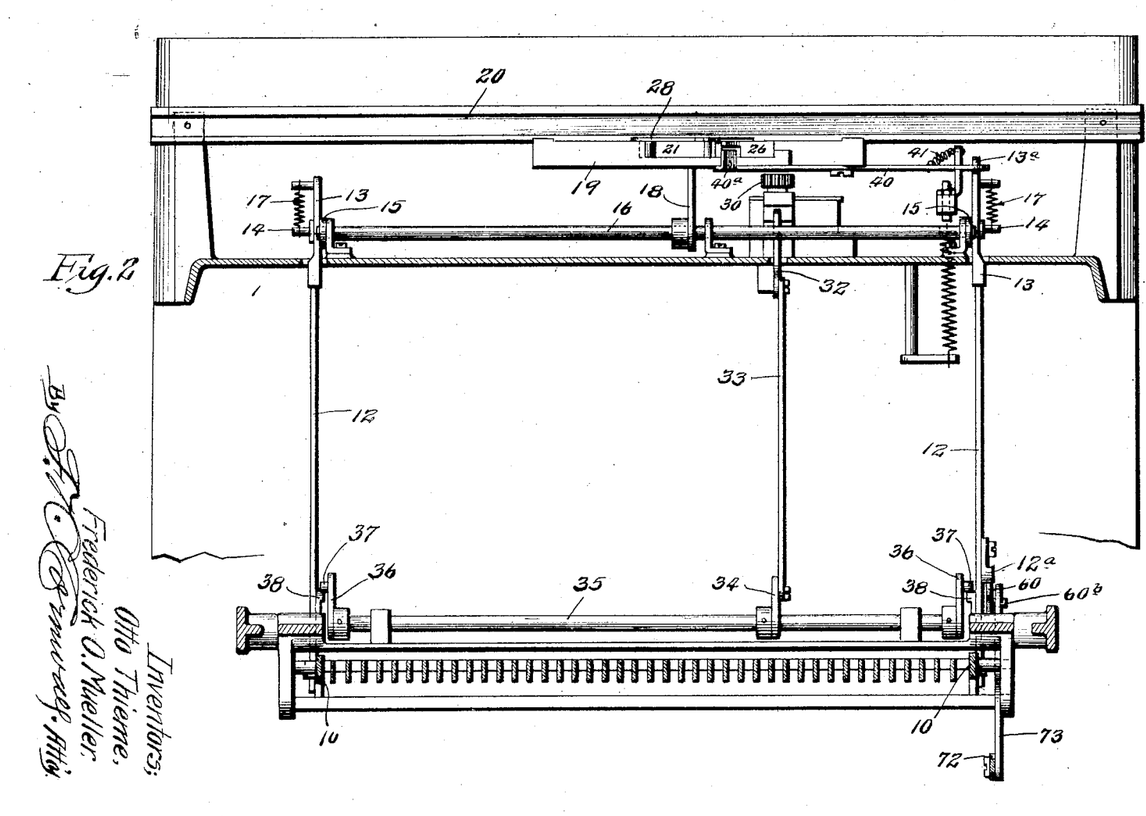
Fig. 2 is a front elevational view partly in section of the same.

The operation of the parts above described is as follows: Whenever the tabulating key is depressed, it will rock the shaft 16 and through the finger 18 move the anvil block forwardly to a position where its end will lie in the path of movement of the stop block 22 on the paper carriage. At the same time that the anvil block is positioned, the pinion 30, which normally meshes with rack 31 arranged on the carriage, is moved rearwardly so as to release the rack and permit its leftward movement. This pinion is operated by means of a bell crank 32 with a rock arm 34 on shaft 35 which shaft carries rock arms 36 carrying pins 37 lying over blocks 38 carried by tabulating bars 12 (see Fig. 2). Thus, in connection with the positioning of the anvil block, the pinion 30 is disengaged from rack 31 and the carriage will move leftwardly under the impelling action of its spring until the tabulating stop 22 strikes the anvil block. In approaching the anvil block, the rebound block which has been moved forwardly coincidentally with the positioning of the anvil block, will be struck by the stop 22 and caused to vibrate. The rebound block after being pushed rearwardly by the stop 22 will immediately recover and under the action of its spring 27 move forwardly behind the stop 22 to a position wherein any rebound of the carriage is prevented. After the stop 22 has passed the rebound block and vibrated it as above described, said stop will engage the anvil block moving it leftwardly until the shoulder 21ª is disengaged from the lug 19ª at about which time the stop 22 engages the tooth on the restoring lever, forcing the same and the rebound block rearwardly. The rearward movement of the rebound block permits the lever 24 to drop into the recess 26ª, whereupon the rebound block is locked in its retracted position and with it the restoring lever is also locked against movement and at the same time the lever 24 drops in front of the inclined face 21ᵇ of the anvil block holding it against accidental forward movement. It will thus be seen that when the stop 22 completes the restoration of the anvil block, it will coincidentally restore the rebound block and its connected restoring lever so that the path of the stop 22 is clear for movement of said stop in either direction.

40 indicates a lever pivoted to the lower side of the housing 19, the outer end of which lever coöperates with the hooked upper end 13ª of one of the screw eyes 13. A spring 41 tends to pull this end of lever 40 rearwardly so that when the tabulating key is depressed, the hook 13ª will engage over the outer end of lever 40 and hold the tabulating bar, or bars, 12 lifted. The means for releasing the tabulating bars consists of an inclined face 40ª on the inner end of lever 40 which lies under the inner end of the rebound block, but is not connected to said block. Thus when the stop 22 is operating the rebound block, or immediately after operating said rebound block, it will engage the inclined face 40ª and rock the lever 40 so as to release the tabulating bars 12. When the tabulating bars are released and permitted to drop back into normal position, engagement between the pinion 30 and rack 31 will be reëstablished, which engagement constitutes a lock which will prevent further leftward movement of the carriage, except upon the operation of the letter-spacing mechanism which forms no part of the present invention, or until said pinion is again disengaged upon the operation of the tabulating mechanism.

Figure 1:
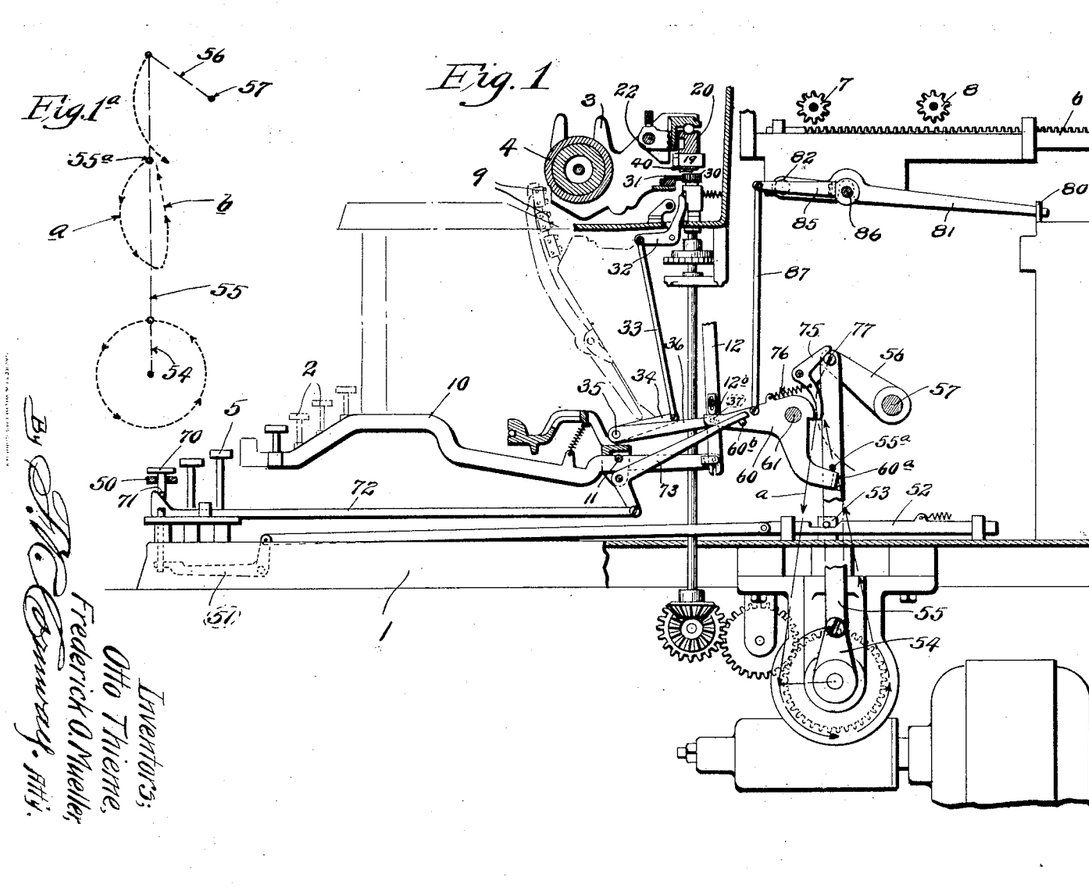
Figure 1 is a side elevational view partly in section of our improved tabulating mechanism.

50 indicates a motor bar which when operated will connect the lever to effect a driving operation of the adding mechanism and also position the tabulating mechanism for operation. This motor bar tabulating key is connected by a bell crank lever 51 to a horizontally movable bar 52 having a beveled or inclined face for coöperating with a pin or projection on the clutch controlling bar 53. When this bar 53 is raised, the clutch will be connected to drive the crank arm 54 which is connected by a bar 55 to a rock arm 56 on the main operating shaft 57 of the adding mechanism. This bar or pitman 55 is provided with a pin 55ª which in the first-half revolution of the crank arm (anti-clockwise) will travel in an arc of a circle such as indicated by the dotted line a, Figs. 1 and 1ᴬ, and on the second-half revolution of said crank arm, the pin will travel in an arc indicated by the dotted line b. This variation in the arc of movement is taken advantage of to control the operation of the tabulating mechanism as the crank arm 54 approaches the completion of one full revolution. In order to do this, there is a bell crank 60 mounted on a shaft 61, the rear end of which is bent inwardly as at 60ª so as to normally lie in the path of movement of the pin 55ª, but in the path of movement of said pin when traveling upwardly along the line b, the forward end of this bell crank lever lies under a block 12ᵇ on the tabulating bar 12, consequently, when motor key 50 is depressed to operatively connect the motor to the adding mechanism, the first-half revolution of the crank arm 54 will cause the pin 55ᵃ to travel in front of the projection 60ᵃ and then as said pin is traveling upwardly along the line b, it will engage said projection 60ᵃ and rock bell crank 60, lifting the tabulating bar 12 and effecting tabulation of the paper carriage as the crank pin approaches the completion of its revolution.

Means are provided for disabling the tabulating mechanism when the motor is operatively connected to drive the adding mechanism. This means consists of a motor key 70 having a pin 71 on its stem, said motor key 70 lying above and overlapping the motor key 50. Thus when the key 70 is depressed, it will not only depress the motor key 50 to operatively connect the motor to the adding mechanism, but the pin 71 will engage the inclined face of the bar 72, which bar is connected at its rear end to a bell crank 73, said bell crank coöperating with a pin 60ᵇ on the bell crank 60 so that said bell crank 73 will operate the bell crank 60 moving the projection 60ᵃ rearwardly out of the upward path of movement of the pin 55ᵃ. Thus the crank arm 54 may make a complete revolution and the pin 55ᵃ will travel in its orbit without operating the bell crank 60.

We provide a lock to hold the bell crank 60 in its disabled position which lock comprises a hooked bell crank lever 75 pivoted to the side frame of the machine, the lower hooked end of which is held forwardly by a spring 76. The upper end of this bell crank lever coöperates with the screw-head 77 or pivotal connection between the pitman 55 and the rock arm 56. When the parts are in their normal position as shown in Fig. 1, the bell crank 75 is operated so that the lower hooked end thereof will be held rearwardly or out of locking engagement with the bell crank 60 (see full line position Fig. 3). When, however, the motor key 70 is operated and the pitman 55 starts to move downwardly, the screw-head 77 will be moved out of the path of the bell crank 75 but permitted to lock the bell crank 60 in its disabled position as shown by dotted lines in Fig. 4. The bell crank 60 is thus held disabled until the pitman 55 can rise and the screw-head 77 operates the locking bell crank 75 to release the bell crank 60.

Figures 3, 3A:
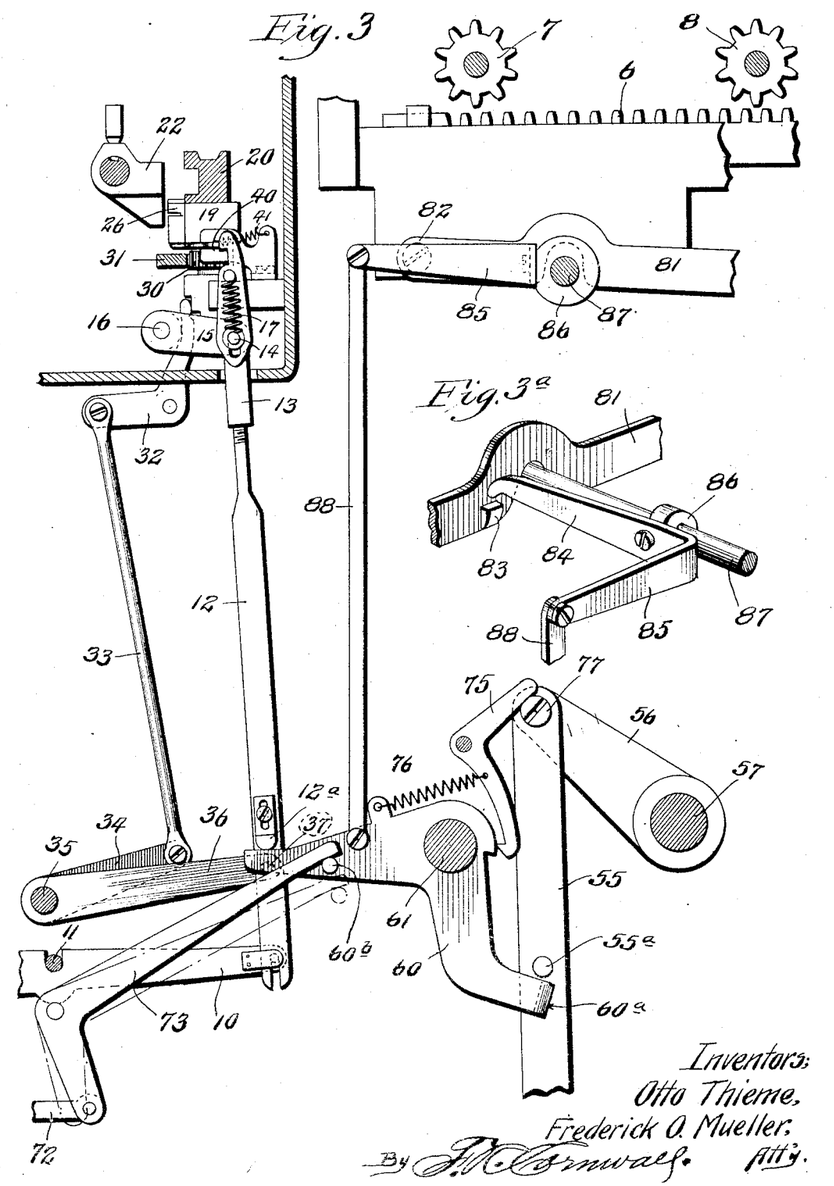

As the multiplier keys of Hubert Hopkins's United States application Serial No. 310,739, above referred to, cause the motor to be operated when said keys are depressed, it follows that some means must be provided for operating the bell crank 60 and move it to its disabled position whenever a multiplier key is depressed. This means consists of a bar 80 which is lifted upon the operation of any of the multiplier keys, said bar operating a lever 81 which lever is pivoted at its forward end to one of the frame pieces of the machine at 82. This lever is provided with a projection 83 (see Figs. 3ᴬ and 4) which lies under a lateral projection 84 of a lever 85 pivoted on a collar 86 of shaft 87. This lever 85, which is in the form of a bent rock arm, is connected by a rod or bar 88 to the bell crank 60. Thus, whenever a multiplier key is depressed and the bar 80 raised, lever 81 will likewise be raised and lift the inner end of lever 85, depressing the bar 88 and moving the bell crank 60 to the dotted line position shown in Fig. 4. As before stated, when in this position, the bell crank 60 will be locked in its disabled position until the pitman 54 makes a complete revolution.

We claim:

1. In a tabulating mechanism for calculating machines, the combination of a paper carriage and its tabulating stop, an anvil block capable of being positioned in the path of movement of said stop to arrest the carriage in a predetermined position, a key for manually positioning said anvil block, an adding mechanism, a motor drive for said adding mechanism, and a key for controlling said motor drive, said last mentioned key having connections whereby said anvil block may be operatively positioned coincidentally with the depression of said motor key for effectively connecting said motor and said adding mechanism.

2. In a tabulating mechanism for calculating machines, the combination of a paper carriage and its tabulating stop, of an anvil block capable of being positioned in the path of movement of said stop, an adding mechanism, a motor drive for said adding mechanism, a key for rendering said motor drive effective with respect to said adding mechanism, means operated by said last mentioned key for also positioning said anvil block; another key in control of said motor drive for rendering the same effective with respect to said adding mechanism, and means operated by said last mentioned key for preventing the positioning movement of said anvil block.

3. In a tabulating mechanism for calculating machines, the combination of a paper carriage and its tabulating stop, of an anvil block designed to coöperate with said stop to arrest the carriage in a predetermined position, an adding mechanism, a motor drive for said adding mechanism, a key for rendering said motor drive effective with respect to said adding mechanism, means operated by the moving part of said adding mechanism for positioning said anvil block and rendering said tabulating mechanism effective, and means operated by said key for disabling or rendering ineffective the moving part of said adding mechanism which positions said anvil block.

4. In a tabulating mechanism for calculating machines, the combination of a paper carriage and its tabulating stop, of an anvil block capable of being positioned to coöperate with said stop to arrest the carriage in a predetermined position, an adding mechanism including a movable part designed to position said anvil block, said adding mechanism also including another part for rendering said anvil block positioning mechanism ineffective in certain operations of the adding machine.

5. In a tabulating mechanism for calculating machines, the combination of a paper carriage and its tabulating stop, of an anvil block capable of being positioned to coöperate with said stop to arrest the carriage in a predetermined position, an adding mechanism including a part designed to position said anvil block, a dual means for disabling the movable part of the adding mechanism, whereby said anvil block is permitted to remain inactive during certain operations of the machine.

6. In a tabulating mechanism for calculating machines, the combination of a paper carriage and its tabulating stop, an anvil block capable of being positioned to coöperate with said stop to arrest the carriage in a predetermined position, an adding mechanism including a part designed to position said anvil block, and independently operative dual means for disabling the effectiveness of the movable part of said adding mechanism, whereby said anvil block is permitted to remain inactive during certain operations of the machine.

7. In a tabulating mechanism for calculating machines, the combination of a paper carriage and its tabulating stop, of an anvil block capable of being positioned to coöperate with said stop to arrest the carriage in a predetermined position, an adding mechanism including a movable part designed to position said anvil block, a motor drive for said adding mechanism, a key for rendering said motor drive effective with respect to said adding mechanism, whereby said anvil block is operated in conjunction with the operation of said adding mechanism upon the depression of said key, and dual means for preventing the movement of said anvil block during certain operations of the machine.

8. In a tabulating mechanism for calculating machines, the combination of a paper carriage and its tabulating stop, an anvil block designed to coöperate with said stop to arrest the carriage in a predetermined position, an adding mechanism, a motor drive for said adding mechanism, a key for rendering said motor drive effective with respect to said adding mechanism, means operated by a moving part of said adding mechanism for positioning said anvil block, a displaceable member coöperating with said anvil block to position the same whenever said displaceable member lies in the path of movement of the movable part of said adding mechanism, and means for operating said displaceable member and moving it to a position wherein the movable part of the adding mechanism may move without positioning said anvil block.

9. In a tabulating mechanism for calculating machines, the combination of a paper carriage and its tabulating stop, of an anvil block designed to coöperate with said stop to arrest the carriage in a predetermined position, a bell crank lever coöperating with said anvil block and being provided with a part lying in the path of movement of a movable part of the adding mechanism, an adding mechanism including the movable part referred to, and means for moving said bell crank lever out of the path of movement of said movable part of the adding mechanism.

In testimony whereof we hereunto affix our signatures, this 24th day of July, 1917.

OTTO THIEME.
FREDERICK OTTO MUELLER.